March 13, 1934. A. E. WEINGARTNER 1,951,002
STEAM TURBINE, SPUR GEAR POWER BOX FOR STOKER DRIVES
Original Filed Feb. 21, 1929 8 Sheets-Sheet 1

Inventor:-
Anthony E. Weingartner,
by his Attorneys,
Howson & Howson

March 13, 1934. A. E. WEINGARTNER 1,951,002
STEAM TURBINE, SPUR GEAR POWER BOX FOR STOKER DRIVES
Original Filed Feb. 21, 1929   8 Sheets-Sheet 2

Inventor:-
Anthony E. Weingartner,
by his Attorneys,
Howson & Howson

March 13, 1934. A. E. WEINGARTNER 1,951,002
STEAM TURBINE, SPUR GEAR POWER BOX FOR STOKER DRIVES
Original Filed Feb. 21, 1929  8 Sheets-Sheet 4

Inventor:-
Anthony E. Weingartner,
by his Attorneys,
Howson & Howson

March 13, 1934. A. E. WEINGARTNER 1,951,002
STEAM TURBINE, SPUR GEAR POWER BOX FOR STOKER DRIVES
Original Filed Feb. 21, 1929 8 Sheets-Sheet 5

Inventor:-
Anthony E. Weingartner,
by his Attorneys,
Howson & Howson

March 13, 1934.  A. E. WEINGARTNER  1,951,002
STEAM TURBINE, SPUR GEAR POWER BOX FOR STOKER DRIVES
Original Filed Feb. 21, 1929    8 Sheets-Sheet 8

Inventor
Anthony E. Weingartner,
by his Attorneys,
Howson & Howson

Patented Mar. 13, 1934

1,951,002

UNITED STATES PATENT OFFICE 1,951,002

STEAM TURBINE, SPUR-GEAR POWER-BOX FOR STOKER DRIVES

Anthony E. Weingartner, Bethlehem, Pa., assignor to American Engineering Company, Philadelphia, Pa., a corporation of Pennsylvania Original application February 21, 1929, Serial No. 341,817. Divided and this application October 28, 1930, Serial No. 491,798

9 Claims. (Cl. 184—6)

This application is a division of my application for patent filed February 21, 1929, Serial No. 341,817.

My invention relates to power apparatus, and it has for one object the provision of a power-box of simple and compact design which is particularly applicable to stoker structures.

Another object of my invention is to provide a power-box, wherein a steam turbine and a power-transmission system are so combined as to form an exceptionally rigid and non-vibrator structure.

Still another object of my invention is to provide power apparatus particularly adapted to stoker structures, characterized by the relatively large range in speeds available.

A further object of my invention is to provide a steam-driven power-box requiring minimum floor space characterized by the fact that the entire driving system is enclosed, so that no moving parts are visible with the exception of the crank shaft.

A still further object of my invention is to provide a lubricating system adapted to insure a constant supply of clean cool lubricant to the several bearings, as well as to the pressure control means for the turbine.

A still further object of my invention is to provide an oil-distribution manifold for the power-box, characterized by the minimum number of parts required, my invention contemplating the forming of the manifold by drilling a recess through an enlarged portion of one wall of the oil-chamber section of the power-box housing.

A still further object of my invention is to provide means, whereby oil accumulating in the chamber portion of the casing containing the chain may be automatically returned to the main oil reservoir upon the movement of the chain, so that the oil in said reservoir may be maintained at approximately a constant level.

With these and other objects and applications in view, my invention further consists in the details of construction and operation and arrangement, hereinafter described and claimed and illustrated in the accompanying drawings, wherein Fig. 1 is a front elevational view of a steam-driven power-box embodying my invention connected to a stoker structure;

Figure 8:
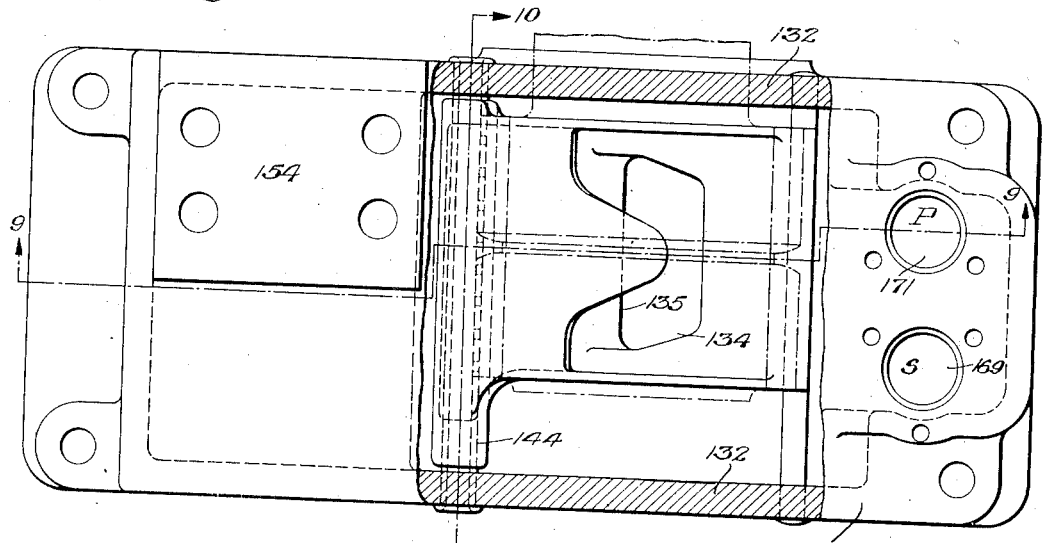
Fig. 8 is an enlarged view of the cover member for the chain-mechanism section of the power-transmission system.
Figure 9:
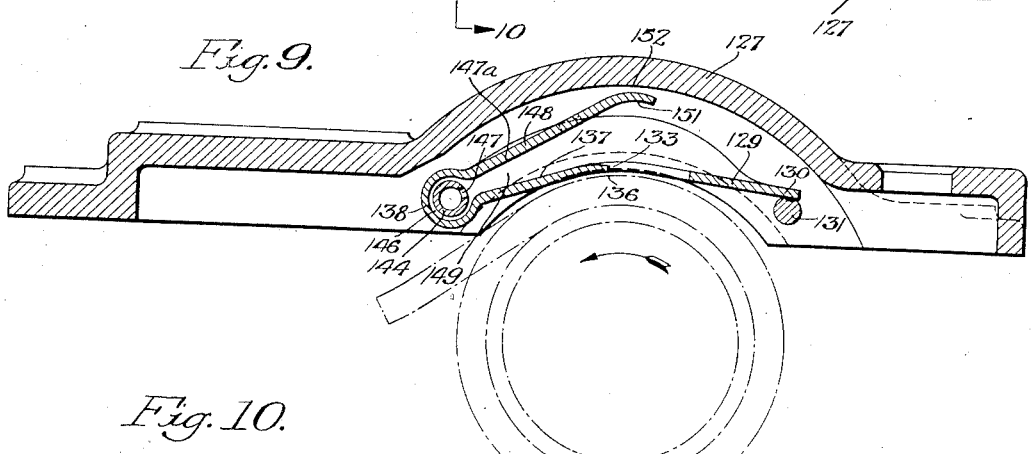
Figure 10:
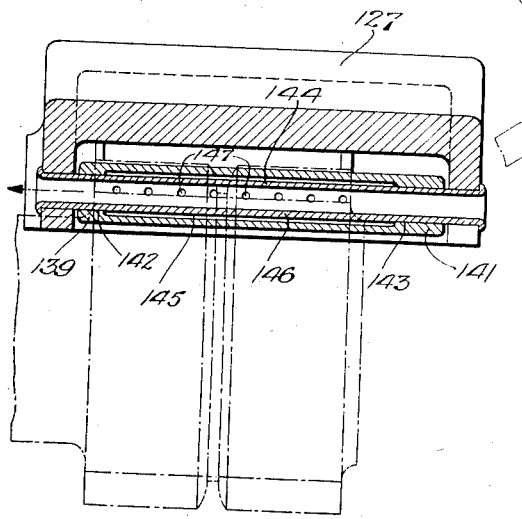
Figure 11:
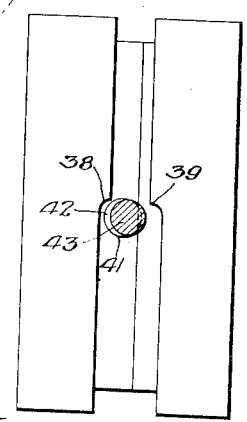

Figs. 9 and 10 are longitudinal and transverse vertical sectional views taken on the lines 9—9 and 10—10 of Fig. 8, respectively;

Fig. 11 is a detail view of the orbit gears with their associated cam; and

Figure 2:
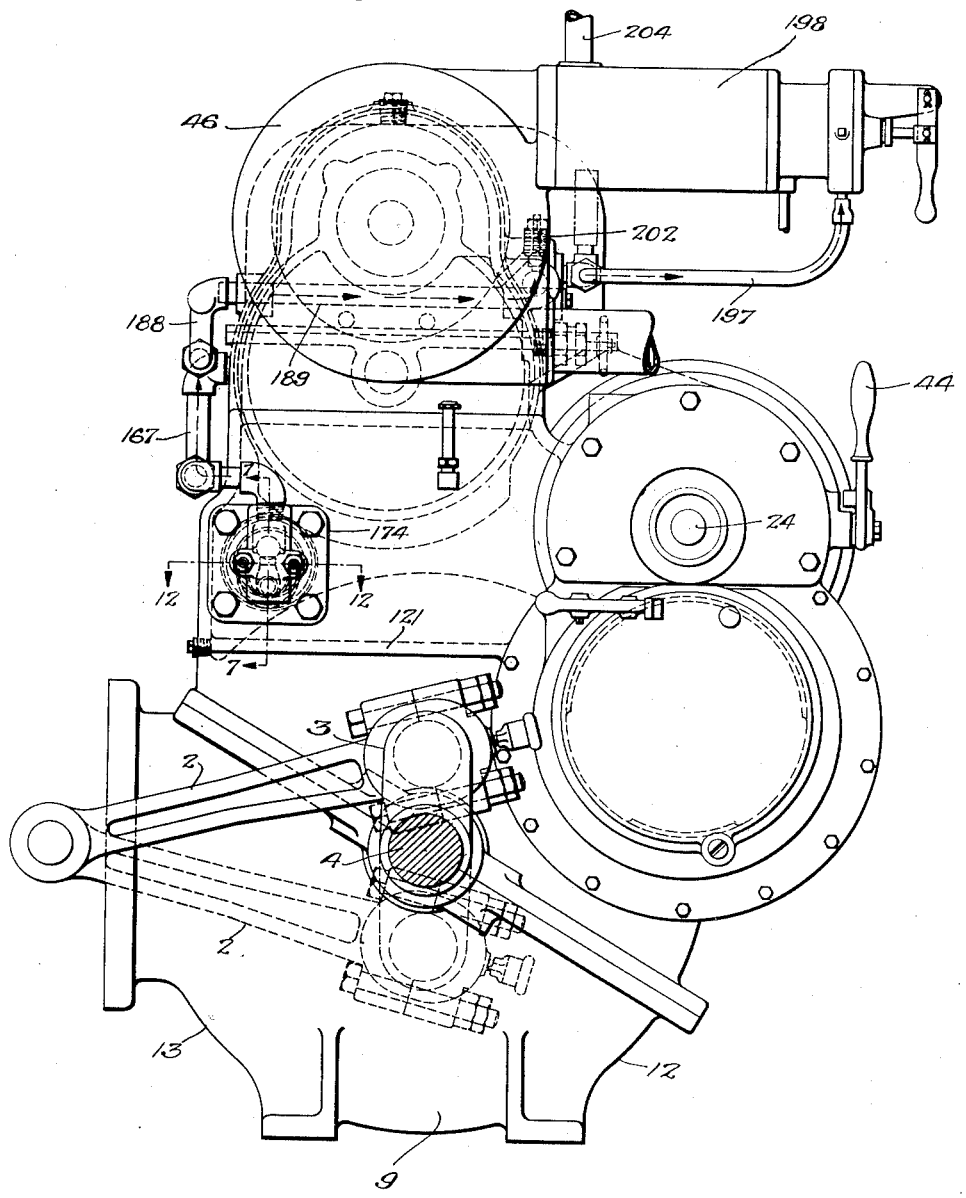
Figs. 2 and 3 are side elevational views of the power-box shown in Fig. 1 looking from the left and right, respectively.
Figure 3:
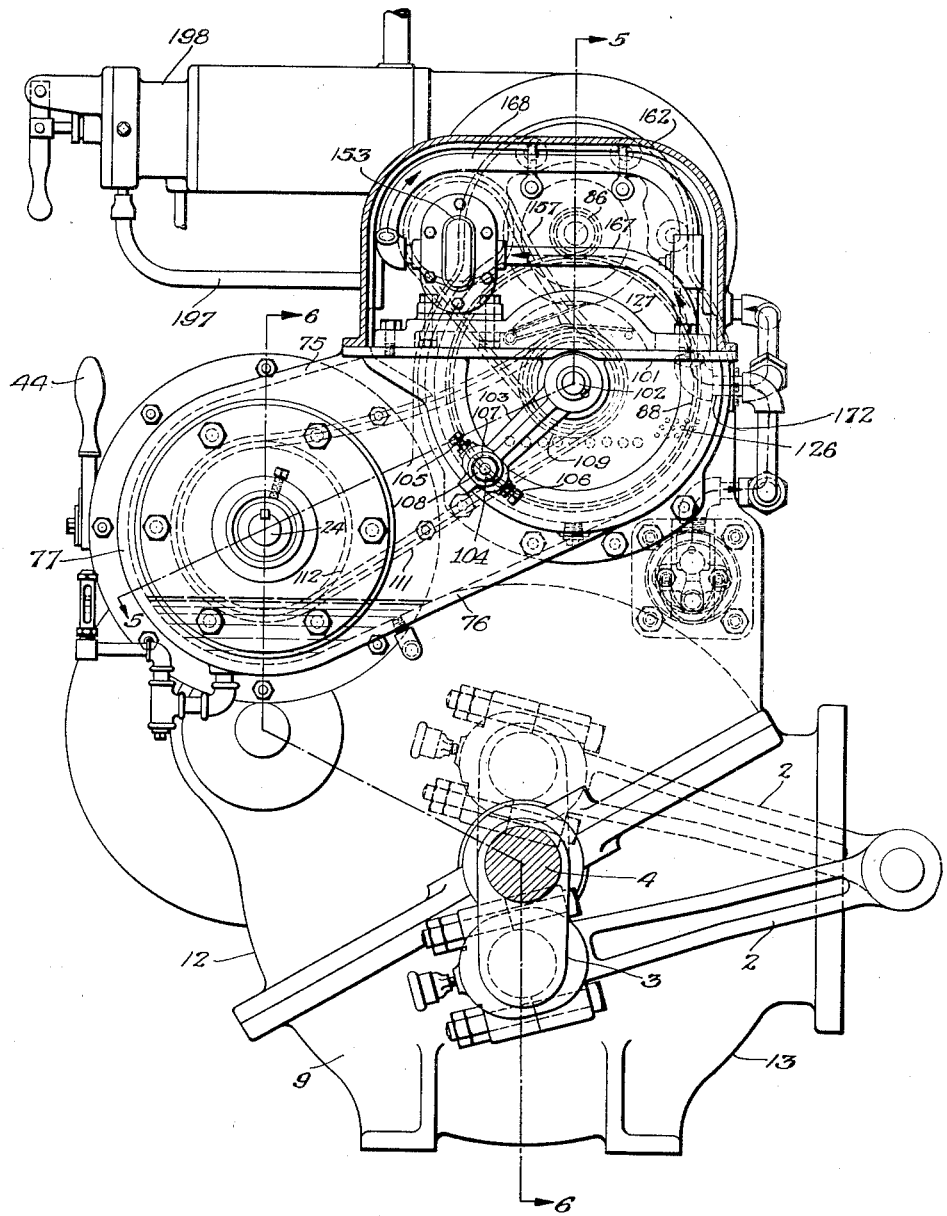
Figure 4:
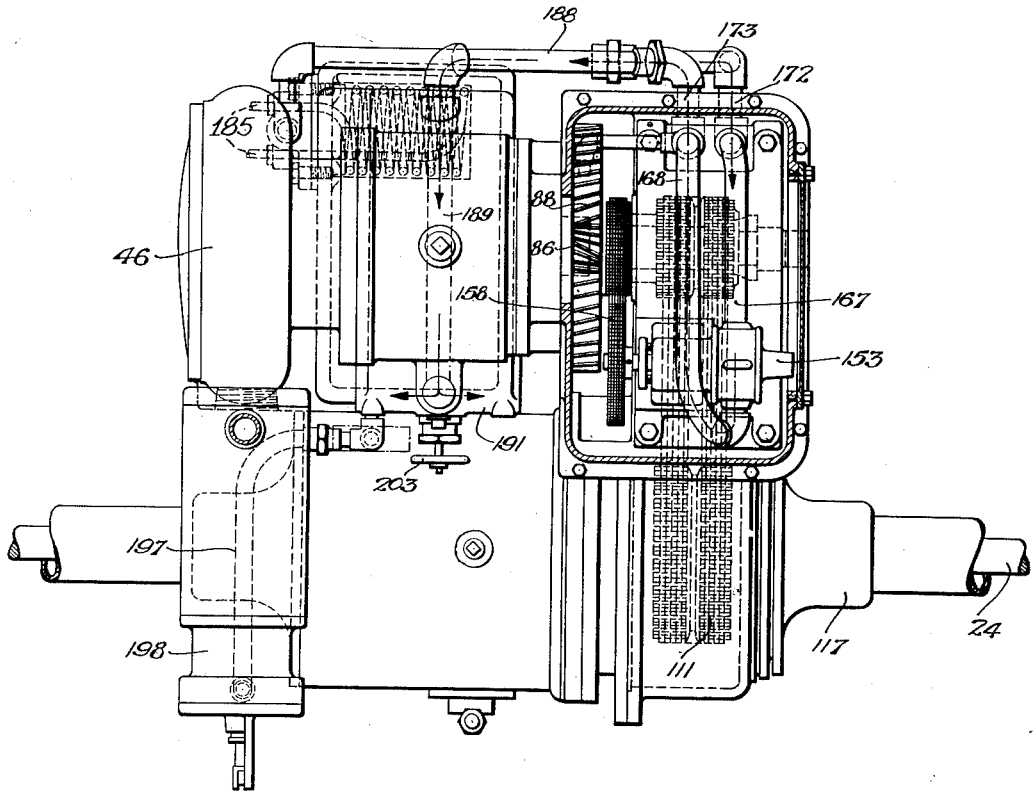
Fig. 4 is a top plan view of the power-box of Fig. 1, with the cover member for the pump shown in horizontal section.
Figure 12:
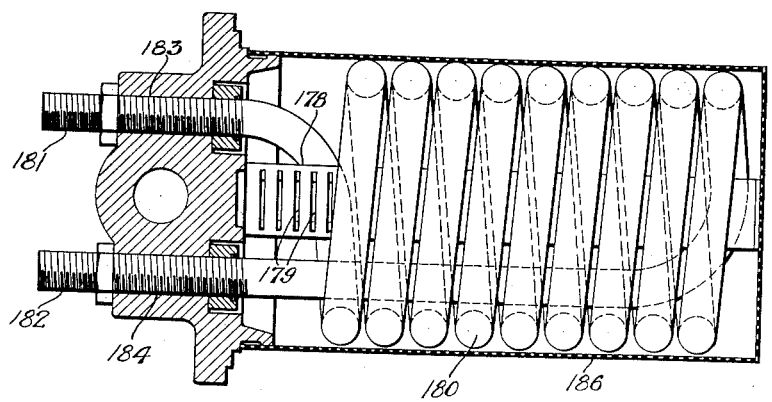

Fig. 12 is an enlarged, detail sectional plan view of the oil-cooling means and associated parts, taken on the line 12—12 of Fig. 2.

Referring to the drawings, stoker rams may be connected by rods 2 to cranks 3 of a driven shaft 4. The shaft 4 extends through openings formed in portions 5 and 6 of spaced side walls 7 and 8 of a housing 9 of a power-box 11, said housing also having front and rear walls 12 and 13, respectively.

Figure 6:
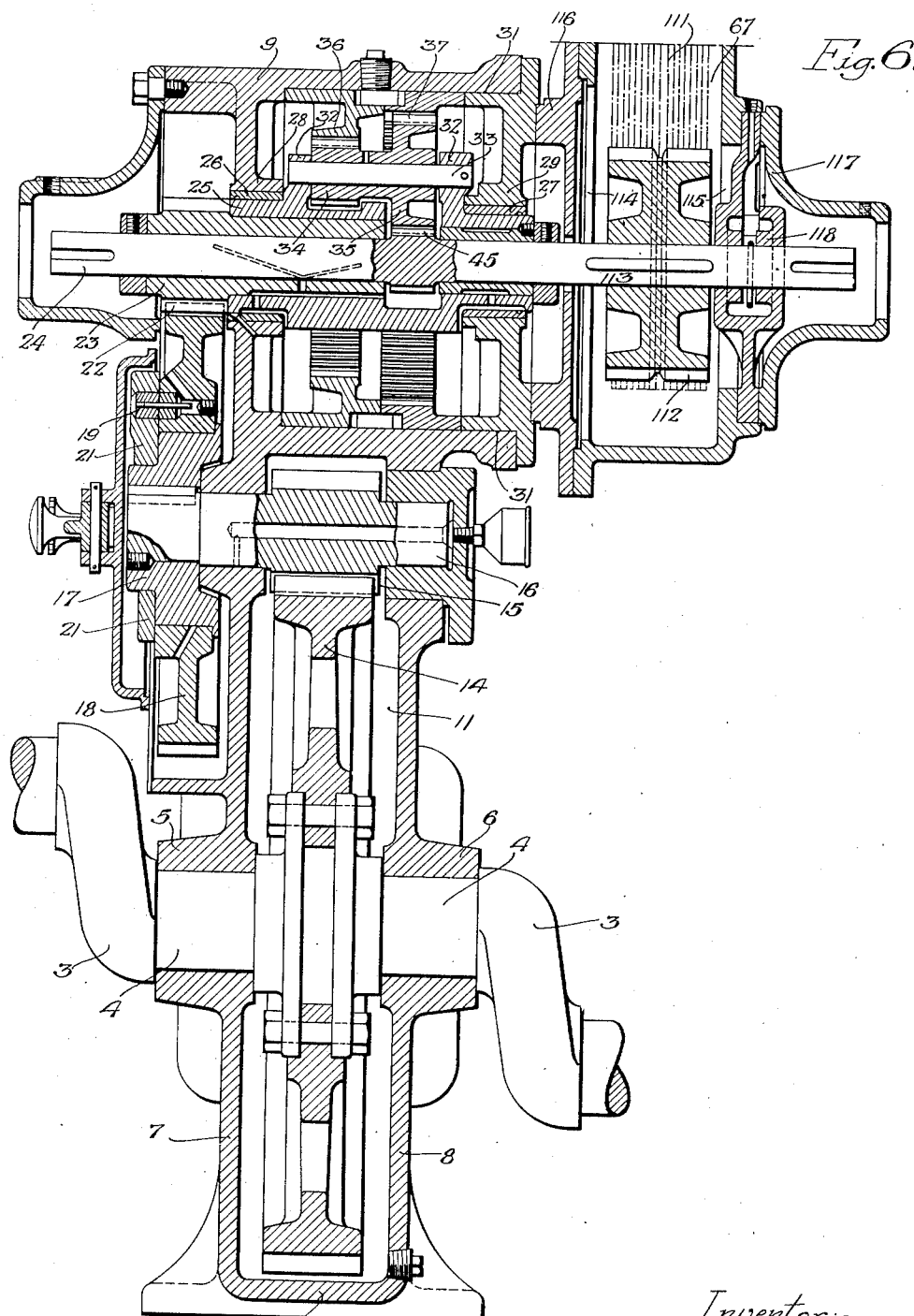
Fig. 6 is a similar view taken on the line 6—6 of Fig. 3.

A relatively large gear-wheel 14 (Fig. 6) is mounted on a portion of the shaft 4 between the side walls 7 and 8, and it meshes with a relatively small pinion 15 positioned on a shaft 16 journaled in the side walls 7 and 8. The shaft 16 extends through the side wall 7 and carries on the outer end thereof a hub 17. The hub 17 affords a relatively large gear-wheel 18 a rotatable mounting, and it is connected by means of a shearable pin 19 to a plate 21 secured to the hub 17. The gearing so far described constitutes the low-speed, heavy-duty section of the gear system.

The gear-wheel 18 meshes with a pinion 22 formed on a sleeve 23 loosely mounted on a horizontally-positioned high-speed shaft 24 extending parallel to the low-speed crank shaft 4. The tubular sleeve 23 is keyed to a sleeve 25, opposite ends of which are journaled in bearings 26 and 27 formed in spaced inwardly-extending flanges 28 and 29, respectively. The flange 28 is integral with the housing 9, while the flange 29 is detachably secured in an opening 31 formed in the housing 9 and serves to close the same. The sleeve 25 is provided with a pair of arms 32 between which extend a non-rotatable spindle 33. The spindle 33 affords a loose mounting for planet gears 34 and 35 of different diameters.

The planet gear 34 meshes with an orbit gear 36 rotatably seated in the housing 9, while the planet gear 35 meshes with an orbit gear 37 similarly mounted in the housing 9. The gears 36 and 37 have their adjacent edges so recessed as to form shoulders 38 and 39. As shown in Fig. 11, a cam 41 is mounted on an inner end 42 of a shaft 43, which extends outwardly of the housing 9 to an operating handle 44, the cam 43 being so positioned between the recessed edges of the orbit gears 36 and 37 as to be movable into a gripping engagement with either of said shoulders 38 and 39, in which position, the cam 43 is also self-locking. When the handle 44 is in the mid or neutral position, the cam 41 is out of engagement with either of the shoulders 38 and 39, permitting the free movement of the orbit gears 36 and 37.

The planet gear 35 meshes with a gear-wheel 45, formed on the high-speed shaft 24, so that when said shaft is rotated, the planet gears 34 and 35 are turned together. Should the operating handle 44 be so turned from its mid-position as to actuate the cam 43 into engagement with the shoulder 38, the orbit gear 36 is held stationary and the planet carrier or sleeve 25 is operated at one speed. Should the other orbit gear 37 be held stationary by an opposite movement of the handle 44, the planet carrier 25 is rotated at a different speed. Thus the speed of the high-speed gear section, which extends from the driving pinion or gear-wheel 45 to the gear-wheel 18, is controlled with these gears permanently in mesh. For a further description of certain of the detail features of the high and low-speed gear sections, reference is made to my Patent No. 1,889,718, patented November 29, 1932, and assigned to the American Engineering Company.

Figure 1:
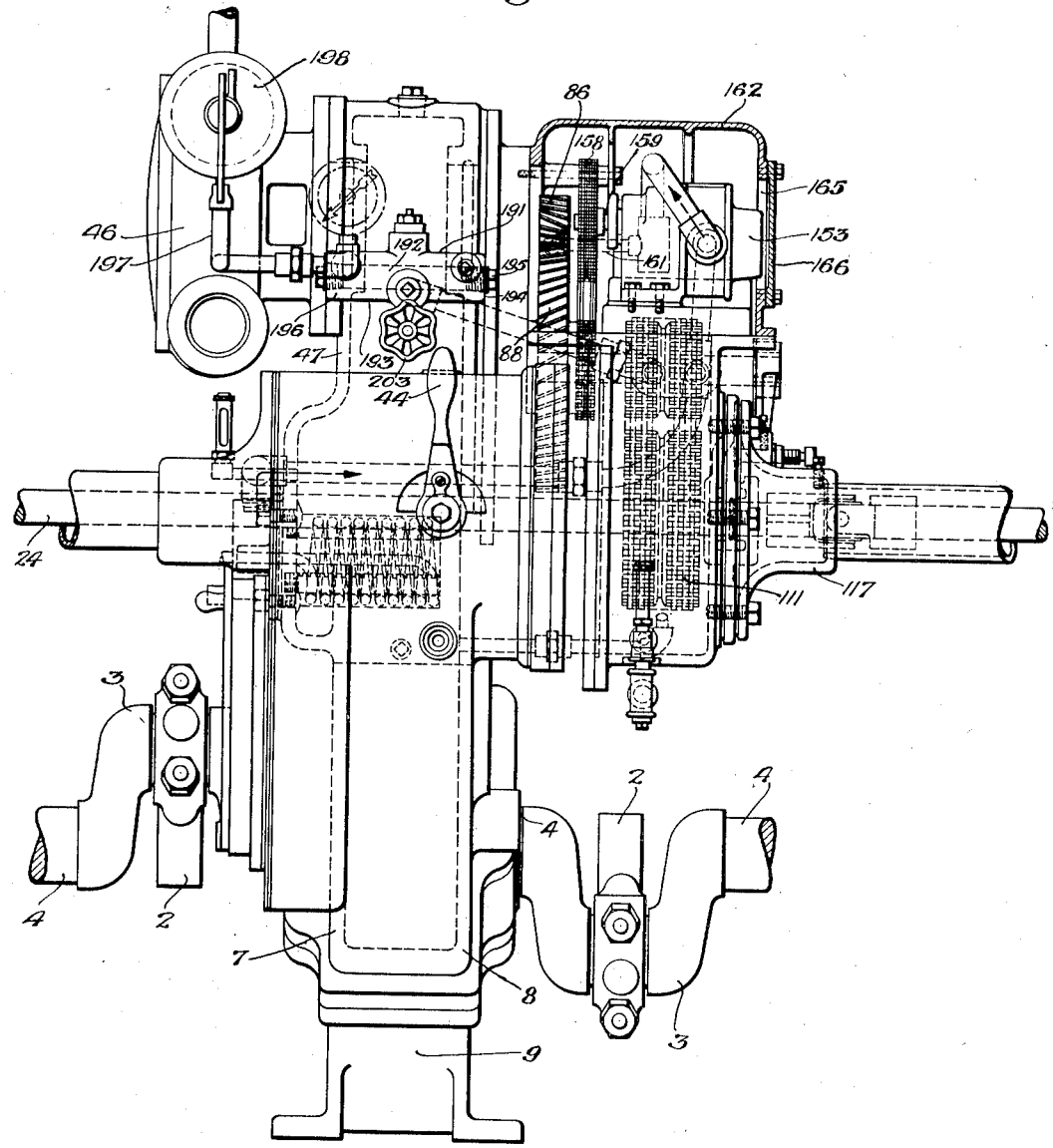
Figure 5:
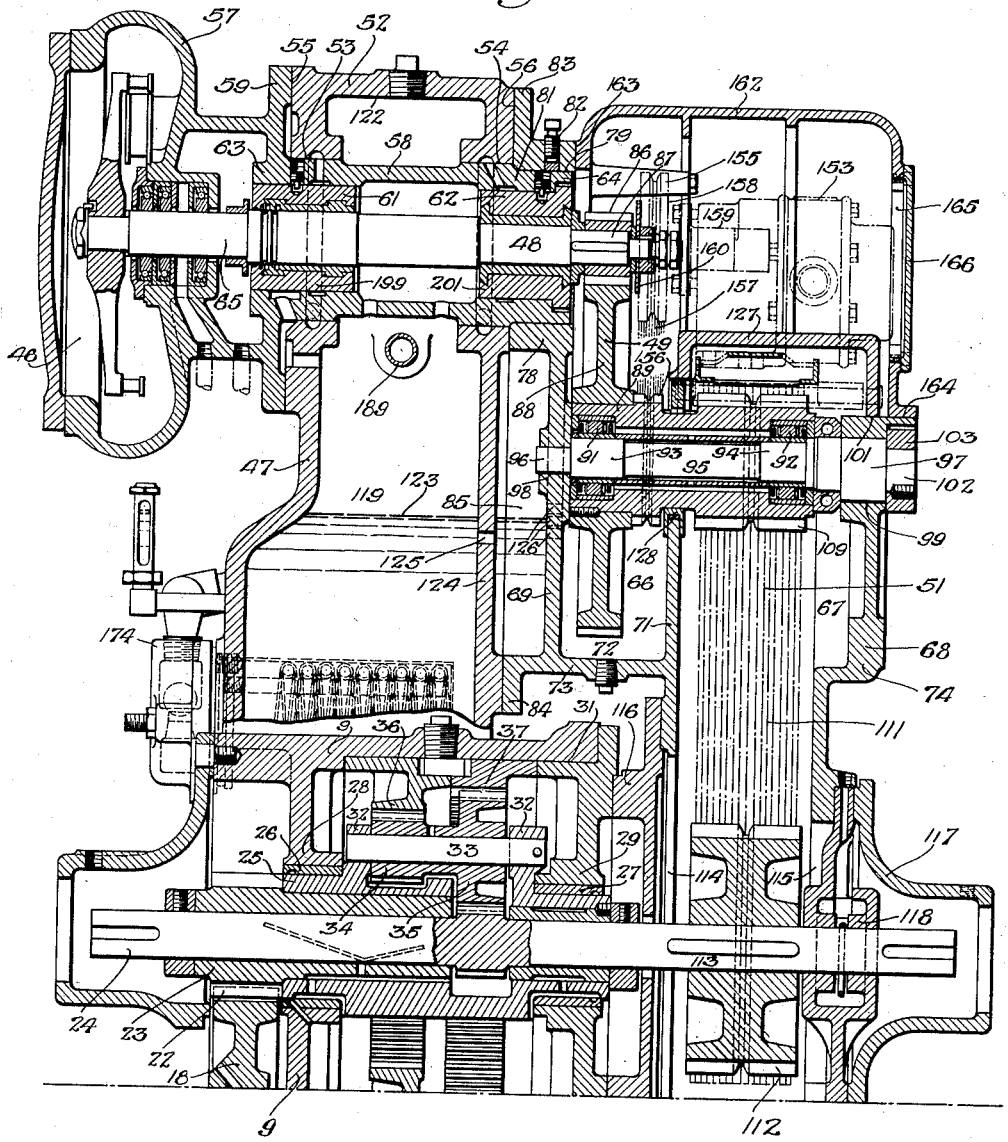
Fig. 5 is an enlarged, detail sectional view, taken on the line 5—5 of Fig. 3.

My invention further contemplates the provision of means, whereby the high-speed shaft 24 may be driven by steam rather than by electrical means, thereby affording a large range in speed variation, say, from 10 to 1. To this end, broadly, I mount a steam turbine 46 of conventional design on an upper portion 47 of the housing 9 which extends above the high-speed shaft 24, as shown in Fig. 1 and then connect a shaft 48 of the turbine by gear and chain systems 49 and 51 to the high-speed shaft 24, as illustrated in Fig. 5.

More specifically, an upper end portion 52 of the housing section 47 is provided with apertures 53 and 54 in spaced side walls 55 and 56 thereof. A housing 57 of the turbine is provided with a tubular extension 58, which closely fits the apertures 53 and 54, as well as a peripheral flange 59 which may be bolted or otherwise secured to the side wall 55. Bearings 61 and 62 are respectively positioned in the tubular end portions 63 and 64 of the housing projection 58, whereby an extended portion 65 of the turbine shaft 48 may be rotatably supported in position. Such method of supporting the turbine 46 in the housing 9 assures a rigid, non-vibratory connection therebetween. The mounting of the turbine 46 on the side of the housing 9, so that the turbine shaft 48 is parallel to the high-speed shaft 24 results in an exceedingly compact unit, occupying a minimum amount of floor space and affording maximum accessibility to the principal portions of the power-box.

The gear and chain systems 49 and 51 are respectively mounted in chambers 66 and 67 of a casing 68, as shown in Figs. 1, 3, 4 and 5. The chamber 66 is formed by a pair of side walls 69 and 71, a pair of end walls 72 and a bottom wall 73, while the chamber 67 comprises the inner side wall 71, an outer wall 74, inclined top and bottom walls 75 and 76 (Fig. 3) and a curved end wall 77. The wall 69 is extended above the upper open sides of the chambers 66 and 67 to provide an upper portion 78. The portion 78 is provided with an opening 79 adapted to receive an outer end portion 81 of the extension portion 58 of the turbine housing 57, the end portion 81 being prevented from turning in the aperture 79 by means of locking means 82, and by the securing means of flange 59.

The portion 78 is also provided with a flange 83 which abuts against the side 56 of the housing portion 47 and may be secured thereto by bolts or other means. The lower portion of the wall 69 is provided with a flange 84, which is positioned in abutting relation with the side 56 of the housing portion 47 and which is connected with the upper flange 83. Thus, a chamber 85 is formed between the side wall 56 and the side wall 69 which is positioned below the turbine shaft extension 48.

The gear system 49 comprises a driving pinion 86, which is mounted on an overhanging end portion 87 of the turbine shaft extension 48 and which meshes with a relatively large gear-wheel 88 keyed on an inner end portion of a tubular shaft 89. The shaft 89 is rotatably mounted on its inner and outer ends on anti-friction devices 91 and 92 respectively carried on eccentric portions 93 and 94 of a jack shaft 95. End portions 96 and 97 of the jack shaft 95 are journaled respectively in apertures 98 and 99 positioned intermediate the upper and lower ends of wall 69 and immediately adjacent to horizontal upper edge portion 101 of wall 74.

An outer end portion 102 (Fig. 3) of the jack shaft 95 is provided with an arm 103 having at one end micrometer-adjusting means 104, whereby the jack shaft 95 may be turned through a predetermined angle. The micrometer adjusting means 104 comprises a pair of oppositely-positioned set screws 105 and 106 which extend into an enlarged opening 107 in the outer end of the arm 103. A stationary bolt 108 extends from the casing 68 between the adjacent inner ends of the set screws 105 and 106 and constitutes an abutment therefor. When it is desired to impart a predetermined angular movement to the jack shaft 95, one of the set screws 105, 106 is loosened while the other is tightened. When the jack shaft 95 is turned in this manner, the position of the rotatable shaft 89 and hence that of the gear-wheel 88 is adjusted bodily relative to the pinion 86. Thus, the distance between the intermediate tubular shaft 89 and the turbine shaft 48 may be varied, thereby insuring the proper meshing of the gear-wheel 88 with the driving pinion 86.

The chain system 51 comprises a sprocket-wheel 109 which is mounted on an outer end of the intermediate tubular shaft 89 in the chamber 67 between the walls 71 and 74. The sprocket-wheel 109 is connected by means of a chain 111 with a second sprocket-wheel 112 mounted on an outer end portion 113 of the high-speed shaft 24 which extends through openings 114 and 115 in the opposite walls 71 and 74 of the chamber 67. Should slack occur in the chain 111, this may be compensated by properly turning the set screws 105 and 106 of the micrometer-adjusting means 104. The gear and chain transmission systems 49 and 51 thus afford an easily adjustable and flexible connection between the turbine shaft 65 and the high-speed shaft 24.

As shown in Fig. 5, the opening 114 in the side wall 71 is closed by means of a circular plate 116 which is secured to the adjacent portion of the casing wall 71, as well as to the closure plate 29. The opening 115 is closed by means of a member 117 which is provided with a bearing 118 for the outer end portion of the high-speed shaft extension 113.

My invention further embodies a simple and efficient system of lubrication for the various bearings of the power-box, the upper housing portion 47 being so formed as to provide a chamber or reservoir 119 which extends from a lower wall 121 thereof upwardly between side walls 55 and 56 to an upper wall 122 positioned just above the extension 58 of the turbine housing 57. The chamber 119 is preferably filled with oil or other lubricating material to a level indicated at 123.

A lower portion 124 of the side wall 56 is provided with a series of apertures 125, extending across the width thereof, which are positioned just below the upper level 123, permitting oil to pass from the chamber 119 into the chamber 85. The chamber 85 is connected to the chamber 66 of the casing 68 by means of a plurality of apertures 126, so that oil is also present in the chamber 66. The passage of oil from the chamber 66 to the chamber 67 is prevented by means of a cover member 127, which encloses the upper side of the chamber 67 and which is mounted on the upper horizontal edges 101 of the walls 71 and 74. Packing 128 is positioned between the wall 71, the cap 127 and the rotatable tubular shaft 89, so as to prevent other than a predetermined limited passage of oil into the chamber 67 at this point, such as is necessary for lubrication.

The accumulation of oil in the chamber 67 is prevented by means of the device shown in Figs. 5, 8, 9 and 10, wherein it will be noted that a curved plate 129 has an outer end portion 130 supported on a pin 131 extending between side walls 132 of the cover member or cap 127. An intermediate portion 133 of the plate 129 is slightly curved and provided with an aperture 134, one edge 135 of which is beveled to form a scraping edge, as shown in Fig. 9, and positioned just above a top portion 136 of the chain system 51, so that a portion of the oil carried upwardly by the chain 111 is removed therefrom and not returned again to the base portion of the chamber 67. The oil thus removed flows over a downwardly-inclined rear portion 137 of the plate 129 into a tubular base portion 138.

Opposite ends 139 and 141 (Fig. 10) of the tubular portion 138 of the plate 129 are provided with inwardly-extending flange portions 142 and 143 which closely fit a pipe 144. The pipe 144 is supported in and extended through the opposite side walls 132 of the cover member 127. The oil flowing down the plate portion 137 accumulates in a recess 145 between an intermediate portion 146 of the pipe 144 and the tubular plate portion 138. The intermediate portion 146 is provided with a plurality of apertures 147, so that the oil may readily pass into the pipe 144. The ends of the pipe 144 open into the casing 68, the inner end opening directly into the chamber 66, permitting the oil passing therefrom to drain back into the chamber 66.

An upper edge 147a of the tubular portion 138 is extended upwardly toward the free end 130 of the plate 129 by means of a plate portion 148, thereby forming with the rear end portion 137 a chamber 149 in which the oil may accumulate in the event that it does not immediately drain through the discharge pipe 144. An end 151 of the bent-back wall portion 148 is somewhat resilient and engages an upper side 152 of the cap member 127, whereby the plate 129 may be resiliently held in position. Should such oil-collecting means not be used in the chamber 67, the oil would not only accumulate therein to an undesirable extent, but difficulty would also be had in maintaining the proper oil level in the main reservoir 119.

An oil pump 153 of conventional design may be bolted on a front portion 154 of the cover member 127, and it is driven by means of chain mechanism 155. The mechanism 155 comprises a sprocket-wheel 156, which is secured on the tubular shaft 89 between the gear-wheel 49 and the wall 71, a connecting chain 157, and a second sprocket-wheel 158. The sprocket-wheel 158 is mounted on an upper end of a shaft 159 of the pump 153.

The lubrication of the gear system 49, as well as the chain mechanism 155, is accomplished by means of a rotary plate 160 (Fig. 5) which is mounted on the turbine-shaft end portion 87 just beyond the drive gear 86. The rotary plate 160 is of such diameter as to extend beyond the meshing point of the gear-wheels 49 and 86 so as to be in the path of travel of the oil which is forced from between these two gears wheels. The oil striking the rotary plate 160 is thrown outwardly by centrifugal force, thereby assuring a proper lubrication of adjacent rotary parts. The lubrication of these parts may also be effected by means of a pipe 161 carrying oil under pressure from the pump 153, as shown in Fig. 1.

As shown in Figs. 1, 3, 4 and 5, the oil thrown by the rotary plate 160 is confined to the space immediately adjacent to the chamber 66 by means of a cover member or housing 162 which encloses the open upper side of the chamber 66, the cover member 127 for the chamber 67, the pump 153, the gear system 49 and the pump-driving mechanism 155. An inner end portion 163 of the housing 162 abuts against the outer surface of the side wall 69 and its extended portion 78, while lower edge portions 164 are mounted on the upper horizontal edges 101 of the casing 68. An outer end of the cover member 162 is provided with an opening 165 and a removable closure plate 166, whereby access may be had to the parts within the cover member 162.

The pump 153 is provided with suction and discharge pipes 167 and 168 which extend therefrom downwardly through apertures 169 and 171 in the rear end portion of the cover plate 127. The suction and discharge pipes 167 and 168 are then extended outwardly of the power-box through the openings 172 and 173 formed in the rear wall portion of the chamber 67. The suction pipe 167 terminates in the valve plate 174 positioned on the side wall 55 immediately adjacent to the base portion of the oil chamber 119.

Figure 7:
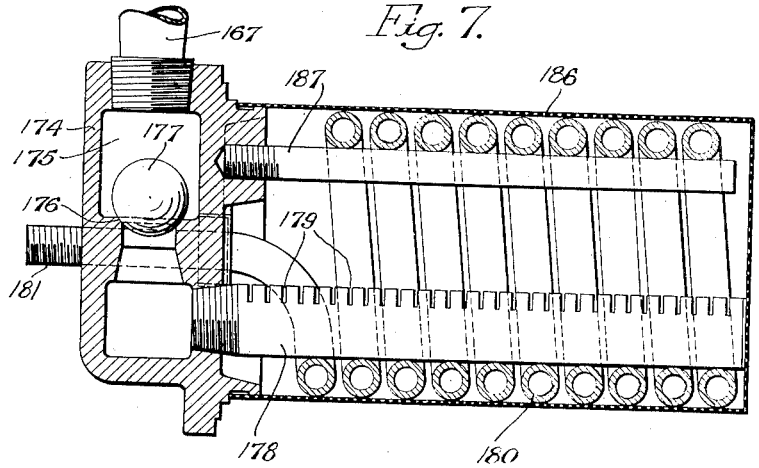
Fig. 7 is an enlarged, detail vertical sectional view of the oil-cooling means and associated parts, taken on the line 7—7 of Fig. 2.

The valve plate 174 (Figs. 2, 5 and 7) is provided with a vertical passage 175 in communication with the suction pipe 167. The passage 175 is provided with a restricted portion forming a seat 176 for a ball valve 177 adapted to prevent a reverse flow of the oil through the suction pipe 167 thereby insuring a constant supply of oil in the suction pipe 167. The portion of the passage 175 beyond the valve 177 is connected to a suction pipe 178, which extends through the adjacent portion of the wall 55 into the bottom portion of the oil chamber 119, and it is provided with a plurality of slotted openings 179. In order that the oil may be cooled, a tubular cooling coil 180 is positioned in the lower portion of the chamber 119 so as to surround the suction pipe 178. Opposite ends 181 and 182 of the coil 180 extend through the wall 55 and openings 183 and 184 in the valve plate 174, respectively, and are connected by pipes 185 to a cooling system (not shown).

The cooling coil 180, as well as the suction pipe 178, are enclosed by means of a tubular screen 186 which extends outwardly from the valve plate 174, whereby only clean oil may be supplied to the suction pipe 178. A supporting rod 187 extends inwardly from the valve plate 174 just below the upper side of the cooling coil 180, so that the latter may be rigidly secured in position. The cooling coil 180, the screen 186, the suction pipe 178, and the valve plate 174 thus constitute the removable unit which may be easily detached from the power-box for purposes of replacement or repair.

The pressure pipe 168 is provided with a section 188 positioned exteriorly of the power-box and a section 189 which extends through the oil chamber 119, just below the turbine extension 58, between the front and rear walls 12 and 13, respectively, of the power-box housing 9. In accordance with my invention, the pipe section 189 is core cast.

A still further feature of my invention is the provision of a distributing manifold 191 in the upper front wall portion of the housing section 47, comprising an aperture 192 which is drilled horizontally in a tubular housing portion 193. The formation of the manifold 191 of an integral portion of the housing 9 permits the elimination of the numerous pipes and fittings characteristic of such structures. One end 194 of the aperture or boring 192 is closed by means of a plug 195, while an opposite end 196 is connected by means of a pipe 197 to a governor 198 for the turbine 46.

The manifold 191 is also connected by passages 199 and 201 to the spaced bearings 61 and 62 for the turbine-shaft extension 48. A safety valve 202 is also connected to the manifold 191. A by-pass valve 203 is connected to the manifold 191 and to the oil chamber 119, whereby the pressure of the oil in the manifold 191 may be controlled. The governor 198 for the turbine 46 is so designed that when the by-pass valve 203 is fully opened, the speed of the turbine 46 is a maximum, but that when the valve 203 is fully closed, the speed of the turbine 46 is a minimum, thereby providing desired range in speed variation of the turbine shaft 48.

In operation, assuming the turbine is supplied with steam through a pipe 204 and the control valve 203 fully closed, the speed of the turbine is a minimum. If the control lever 44 is now moved to the right of its mid-position, the orbit gear 37 is locked, resulting in the relatively slow movement of the gear system connecting the high-speed shaft 24 and the stoker shaft 4. Should the lever 44 be moved in the opposite direction from its mid-position, the orbit gear 36 is held stationary, so that the operating speed of the shaft 4 is slightly increased. Should it be desired to operate the shaft 4 at an increased speed, the by-pass valve 203 is opened slightly, permitting the turbine 46 to operate at a higher rate of speed. The speed of the shaft 4 may now be adjusted above or below that determined by the turbine 46 merely by moving the handle 44 to the right or left.

The operation of the turbine-driven intermediate shaft 89 through the chain system 155 causes the turning of the pump 153, with the result that cooled lubricating oil is drawn from the main oil reservoir 119 through the screen 186 into the suction pipe 178, and is finally distributed to the various parts of the power-box from the manifold 191. Such oil as passes into the chamber 67 around the packing 128 is returned to the chamber 66 and out into the main reservoir 119 through the openings 125 and 126, by means of the oil-collector device immediately below the cover member 127.

While I have shown only one embodiment of my invention, for the purpose of describing the same and illustrating its principles of construction and operation, it is apparent that various changes and modifications may be made therein, without departing from the spirit of my invention. I desire, therefore, that only such limitations shall be imposed thereon, as are indicated in the appended claims or as are demanded by the prior art.

I claim:

1. In combination, a rotary member provided with a material on the periphery thereof, a plate provided with an opening forming a scraping edge, supporting means for one end portion of said plate, and a tubular supporting member for another portion of said plate, said tubular supporting member being provided with apertures adapted to receive fluid removed by said scraping edge from said rotary member, said plate having a bent-back portion adapted to engage a stop, so that said plate may be held in position.

2. In power drive mechanism, the combination with a drive shaft, of a second shaft, and transmission elements operatively connecting said shafts, a fluid pump, transmission means operatively connecting said fluid pump with the second shaft, a housing in which said shafts are journaled, said housing having separate chambers, one of which constitutes a reservoir for lubricant and another of which embraces said transmission mechanisms and the pump, means providing communication between said chambers whereby a portion of said transmission mechanism is immersed in said lubricant, means providing for lubrication of said transmission mechanisms and the bearings of the said second shaft by lubricant entrained by the transmission mechanism, means connecting the suction side of said pump with the body of lubricant in said reservoir, and ducts connecting the discharge of said pump with the bearings of the drive shaft.

3. In power drive mechanism, the combination with a drive shaft, of a second shaft, and transmission elements operatively connecting said shafts, a fluid pump, transmission means operatively connecting said fluid pump with the second shaft, a housing in which said shafts are journaled, said housing having separate chambers, one of which constitutes a reservoir for lubricant and another of which embraces said transmission mechanisms and the pump, means providing communication between said chambers whereby a portion of said transmission mechanism is immersed in said lubricant, means providing for lubrication of said transmission mechanisms and the bearings of the said second shaft by lubricant entrained by the transmission mechanism, means connecting the suction side of said pump with the body of lubricant in said reservoir and the discharge side of said pump with the bearings of the drive shaft, and means for cooling the lubricant withdrawn by said pump from the reservoir.

4. In power drive mechanism, the combination with a drive shaft, of a second shaft, and transmission elements connecting said shafts, a fluid pump, transmission mechanism connecting said pump with said second shaft, a motor connected with said drive shaft, a housing for said mechanism, said housing having a chamber constituting a reservoir for a lubricant, means connecting the suction side of said pump with the body of lubricant in said reservoir and the discharge of said pump with the various parts of said mechanism requiring lubrication, a fluid pressure-regulated governor for said motor, means for operatively connecting said governor with the pump, and a valve-controlled bypass from said connection to the reservoir whereby the pressure applied by said pump to the governor may be regulated.

5. In power drive mechanism, the combination with a drive shaft, and transmission mechanism connected therewith, of a motor for driving said shaft, a housing for said shaft and mechanism, said housing including a reservoir for a lubricant, a pump operatively connected with said shaft, a fluid pressure-controlled governor for said motor, a manifold, and means connecting the pump with the reservoir and said manifold whereby lubricant may be supplied to the latter under pressure, lubricating ducts extending to parts of said mechanism from said manifold, means for connecting the manifold to said governor, and a valve-controlled bypass extending from said manifold to the reservoir for regulating the fluid pressure applied to the governor.

6. In power drive mechanism, the combination with a drive shaft, of a driven shaft, an intermediate shaft, and transmission mechanisms respectively connecting the drive shaft with the intermediate shaft and the intermediate shaft with the driven shaft, a housing for said drive mechanism comprising separate chambers, one of which constitutes a reservoir for a lubricant, a second of which embraces the transmission mechanism connecting the drive shaft with the intermediate shaft, and a third embracing the transmission mechanism connecting the intermediate shaft with the driven shaft, means for establishing communication between the first and second-named chambers whereby the lubricant in the reservoir is made available for lubrication of the first-named transmission mechanism, means permitting a limited flow of lubricant from said second chamber to the third chamber for lubricating the transmission mechanism therein, means for returning lubricant from said third chamber to the reservoir to thereby prevent accumulations of lubricant in said chamber, a pump operatively connected with said drive shaft and with said reservoir, and means for directing lubricant withdrawn by said pump from the reservoir to the bearings of said drive shaft.

7. In power drive mechanism, the combination with a drive shaft and a driven shaft, of an intermediate shaft, and transmission mechanisms operatively connecting the drive shaft with the intermediate shaft and the intermediate shaft with the driven shaft respectively, a housing for said drive mechanism comprising chambers respectively enclosing said transmission mechanisms, means for admitting lubricant to the first-named chamber to afford a lubrication of the transmission mechanism connecting the drive shaft with the intermediate shaft, means for permitting a limited flow of lubricant from the first chamber to the second chamber for lubricating the transmission mechanism connecting the intermediate shaft with the driven shaft, and means for returning lubricant from the second chamber to the first to prevent accumulation of lubricant in the second chamber.

8. In power drive mechanism, the combination with a pair of shafts, and transmission mechanism connecting said shafts, of a housing having a chamber embracing said transmission mechanism and comprising also a second chamber constituting a reservoir for a lubricant, means for admitting lubricant from said reservoir to the first-named chamber to lubricate said transmission mechanism, and means operatively associated with said transmission mechanism for returning excess lubricant from the first-named chamber to the reservoir, said last mentioned means including a member for removing at least a portion of the lubricant adhering to said transmission mechanism.

9. In power drive mechanism, the combination with a drive shaft, of a driven shaft, a gear on said driven shaft, and a pinion on said drive shaft meshing with said gear, a fluid pump, and transmission mechanism operatively connecting the pump with the driven shaft, a housing in which said shafts are journaled, said housing having a lubricant-containing chamber embracing the lower portion of said gear, a splash plate mounted on the drive shaft adjacent said pinion in position to receive lubricant forced transversely from between the intermeshing teeth of said gear and pinion and adapted to project said lubricant by centrifugal action onto said transmission, and means for connecting the pump with the body of lubricant in the reservoir and with the bearings of said drive shaft whereby lubricant withdrawn from the reservoir is directed to said bearings.

ANTHONY E. WEINGARTNER.